United States Patent Office 3,509,080
Patented Apr. 28, 1970

3,509,080
METHOD OF MANUFACTURING ANTIOXIDANT FOR RUBBER AND A RUBBER COMPOSITION COMPOUNDING THE ANTIOXIDANT
Sakae Muto and Akira Koga, Tokyo, Shigetake Sato, Yokohama, and Masumi Kiumi, Masanori Takehisa, and Takashi Watanabe, Tokyo, Japan, assignors to Bridgestone Tire Company Limited and Ouchi Shinko Chemical Industry Company Limited, both of Tokyo, Japan
No Drawing. Filed Jan. 19, 1967, Ser. No. 610,222
Claims priority, application Japan, Jan. 26, 1966, 41/4,093; Apr. 8, 1966, 41/21,725
Int. Cl. C08c 11/46
U.S. Cl. 260—3
30 Claims

ABSTRACT OF THE DISCLOSURE

A method of producing antioxidants for rubber wherein meta-phenylenediamine or derivatives thereof are reacted with an aldehyde compound to obtain an amine intermediate product, which is condensed with a ketone compound in the presence of iodine or boron trifluoride as catalyst or wherein meta-phenylenediamine or derivatives thereof are condensed with a ketone compound in the presence of iodine or boron trifluoride as catalyst.

---

The present invention relates to a method of manufacturing a novel antioxidant for rubber, and a rubber composition compounding the antioxidant according to the present invention. More particularly, the present invention relates to production of an antioxidant for rubber, wherein meta-phenylenediamine, its derivatives and mixtures thereof are condensed with a ketone compound or wherein meta-phenylenediamine, its derivatives and mixtures thereof are reacted with an aldehyde compound and then the resulting intermediate product is condensed with a ketone compound and a rubber composition compounded with the antioxidant.

As antioxidant for rubber, use has been previously made of amine compounds, such as, para-phenylenediamine, naphthylamine, and derivatives thereof and phenol compounds. Particularly, in the phenylenediamine series antioxidants very frequently used, heretofore the substituted compound, wherein the amine substituent is in para-position, has the highest activity for the antioxidation due to its resonance structure, so that the commercially available antioxidants are mostly para-substituted compounds, and it has been mentioned that meta-phenylenediamine and its derivatives to be used in the present invention have substantially weak activity for the antioxidation.

However, the present inventors have attempted to develop the antioxidant by using meta-phenylenediamine and its derivatives as starting material and found that the meta-substituted compound, which has been ignored entirely heretofore, has a remarkable activity for the antioxidation by effecting a treatment described in the present invention and the present invention has been attained.

The meta-phenylenediamine and its derivatives to be used in the present invention have the following chemical configuration:

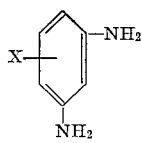

wherein X is hydrogen, alkyl groups, hydroxyl group, alkoxyl groups, halogen atoms, alkylamino groups, phenylamino group, substituted phenylamino groups, alicyclic amino groups, or heterocyclic amino groups, for example, meta-phenylenediamine, 2,4- and 2,6-tolylenediamine, 2,4- and 2,6-diaminophenol, 1-ethoxy-2,4-phenylenediamine, 1-chloro-2,4-phenylenediamine, 1-chloro-2,6-phenylenediamine, 1-phenylamino-2,4-phenylenediamine, 1-cyclohexylamino-2,4-phenylenediamine, 1 - morpholino-2,4-phenylenediamine and preferably, meta-phenylenediamine, 2,4- and 2,6-tolylenediamine and mixtures thereof.

The first aspect of the present invention consists in a method of producing an antioxidant for rubber characterized in that the above described meta-phenylenediamine or its derivatives are heated in the presence of a catalyst such as iodine or boron trifluoride etc. and the resulting mixture is added gradually with a ketone compound to effect condensation reaction and then the reaction product is washed with water or alkali, or extracted with a solvent to separate the catalyst used in the reaction and thereafter the solvent used in the extraction is removed. The antioxidants thus obtained have a remarkable antioxidant effect, but some of them may have scorching property depending upon the reaction condition in the synthesis, and particularly, as the efficiencies of installation of Banbury mixer, extruder and calender are increased, the temperature of manufacturing the compounded rubber is raised and the compounded rubber becomes scorchy. In this case, it is apparently desirable that the antioxidant has also a higher scorch resistance, and then the present inventors have attained the second aspect of the invention considering the scorch resistance. Namely, this aspect consists in a method of producing antioxidant for rubber characterized in that the meta-phenylenediamine and its derivatives are previously reacted with an aldehyde compound to produce an amine intermediate product and then the resulting amine intermediate product is dissolved in an amine type solvent etc., after which, in the same manner as in the first aspect of the invention, the resulting solution is heated in the presence of a catalyst of iodine or boron trifluoride etc. and a ketone compound is gradually added thereto to effect condensation reaction and then the solvent and catalyst used in the reaction are removed to produce antioxidant for rubber.

It is preferable that the reaction of meta-phenylenediamine or its derivatives with an aldehyde compound in the first step is usually effected in an amount of 1.5 to 3.5 mole of an aldehyde compound per 1 mole of the starting diamine compound. Moreover, it is preferable that the reaction of the starting diamine compound with an aldehyde compound is effected while cooling with ice, for example, in such a case that the reaction is very easily effected as in formaldehyde. Furthermore, the condensation reaction of the diamine compound or the amine intermediate product obtained by reacting with an aldehyde compound, with a ketone compound in the presence of a catalyst of iodine or boron trifluoride, which is commonly carried out in the first and the second aspects of the invention, can be effected in an amount of 2 to 4 mole of the ketone compound per 1 mole of the starting diamine compound or the amine intermediate product obtained by reacting with an aldehyde compound. In this reaction, the amount of catalyst such as iodine or boron trifluoride etc. is within the range of 1.5 to 15% based on an amount of the starting diamine compound or the amine intermediate product fed. The reaction temperature is within the range of 100 to 200° C., and preferably 130 to 180° C., under normal pressure. Moreover, the reaction can be effected under pressure.

A part of the amine type solvent, which is used in the condensation reaction with a ketone compound in the first and second aspects of the invention, reacts with the ketone compound simultaneously to form a condensation product, which may be used in a mixed state in the antioxidant for rubber according to the invention in the mixed state, but in this case, the antioxidant effect is not decreased at all, but rather a synergistic effect can be occasionally expected.

Some of the reaction products described in the above first and second aspects of the invention, namely, the condensation product of the meta-phenylenediamine and its derivatives with a ketone compound or some of the condensation products of the amine intermediate product, which is obtained by reacting firstly with an aldehyde compound, with a ketone compound may be obtained as highly viscous resinous matters. In general, such highly viscous resinous matters are difficult in handling in industrial rubber compounding step. Considering particularly this point, to these condensation products is added an acid catalyst such as hydrochloric acid or sulphuric acid and the mixture is heated while stirring to effect acid polymerization, after which the reaction product is poured into an excess amount of aqueous alkali solution to precipitate the polymerized product as powdery product, which is filtered and dried, whereby finely divided antioxidant for rubber can be obtained. Alternatively, after the acid polymerization is effected, a solvent is added and an aqueous solution of alkali is added to neutralize the reaction product after which the solvent is evaporated to obtain the flaky product.

An amount of hydrochloric acid or sulphuric acid to be added in the acid polymerization, calculated on pure hydrochloric acid or pure sulphuric acid, is within the range of 10 to 300% based on the ketone reaction product. By varying the amount of acid, the polymerization degree can be varied widely, whereby the softening point of the antioxidant thus obtained can be regulated.

Solvents to be used for dissolving the reaction product in order to produce the flaky product after acid polymerization generally include halogenated hydrocarbon organic solvents, such as trichloroethylene, tetrachloroethylene and chloroform and etc. Thus, powdery or flaky antioxidant for rubber can be obtained in these manners, whereby said antioxidant can be readily used in rubber compounding.

The aldehyde compounds to be used in the present invention include, for example, formaldehyde, acetaldehyde, propionaldehyde, n-butylaldehyde, isobutylaldehyde, crotonaldehyde, acrolein, 2-ethylhexenal, benzaldehyde etc., and preferably, formaldehyde and acetaldehyde.

The ketone compounds to be used in the invention include, for example, acetone, methyl ethyl ketone, methyl isobutyl ketone, diethyl ketone, hexanone-2, hexanone-3, di-n-propyl ketone, diisobutyl ketone, cyclohexanone, acetophenone, etc. and preferably acetone.

As the starting materials in the present invention, use may be made of meta-phenylenediamine, its derivatives and mixtures thereof. Furthermore, as a particular case a diamine compound which is a decomposition product of polyurethane polymer can be used as a starting material.

Next, a method of using the antioxidant for rubber according to the present invention will be explained. The antioxidant, which is the condensation product of meta-phenylenediamine and its derivatives obtained according to the present invention is compounded in an amount of 0.01 to 5.0 parts by weight based on 100 parts by weight of rubber. The rubber composition in which the antioxidant produced in the present invention is compounded and which is vulcanized shows a remarkable activity of the antioxidation. Furthermore, the antioxidant according to the present invention can be used together with the other antioxidants previously used. The antioxidant according to the invention can be compounded and used in rubbery substances having useful unsaturated bonds, such as, natural rubber, diene type synthetic rubbers and other synthetic rubbers having a low grade of unsaturation.

In order that the rubber composition compounded with the antioxidant according to the present invention retains the physical properties after aging in the same degree as the rubber composition compounded with conventional antioxidants, the amount to be used can be remarkably decreased and this is an important merit, in rubber industry.

The invention will be explained in more details by the following examples and experimental examples, which are not limited in the scope of the invention.

EXAMPLE 1

Into a reaction vessel were fed 2,000 g. of meta-phenylenediamine and 214.4 g. of iodine and the resulting mixture was heated to about 130° C. while stirring. The stirring was continued and to the mixture were added 11.6 lit. of acetone over 4 hours. After added the total amount of acetone, this temperature was maintained for about 30 minutes and then an excess amount of acetone was recovered. After completed the reaction, the reaction product was dissolved in 9.2 lit. of chloroform and added with 3.7 lit. of 8% aqueous sodium hydroxide solution to extract iodine and then the reaction product was washed with water repeatedly, and chloroform is evaporated to obtain dark brown resinous matter of 2,975 g. (this product was referred to as A).

EXAMPLE 2

Meta-phenylenediamine solution, in which 2,000 g. of meta-phenylenediamine were dissolved completely in about 15 lit. of hot water, was added dropwise to 6.1 lit. of 20% aqueous formaldehyde solution, which have been previously prepared, gradually while cooling with ice and stirring to obtain white precipitate. After added the total amounts of the meta-phenylenediamine solution, the stirring was continued for about 30 minutes. This white precipitate was filtered and dried to obtain a product of about 1,500 g. 1,000 g. of the white precipitate and 122 g. of iodine were dissolved in 1,140 g. of aniline and the resulting solution was heated to about 130° C. To this solution were added 19.6 lit. of acetone while stirring to effect condensation reaction. After completed the addition, stirring was effected to remove excess acetone completely. The resulting product was added directly with 7,600 g. of concentrated hydrochloric acid and the resulting mixture was heated to about 100° C. for 6 hours to effect acid polymerization. After completed the reaction, the reaction product was diluted by adding about 10 lit. of water and the diluted product was dispersed in 20 lit. of 15% aqueous sodium hydroxide solution to separate powdery precipitate. The precipitate was filtered and washed with water and dried to obtain grey brown powdery product of 1,800 g. (this product was referred to as B).

EXAMPLE 3

Into a reaction vessel were fed 2,000 g. of 2,4-tolylenediamine and 190 g. of iodine and the resulting mixture was heated at about 130° C. while stirring. To the resulting mixture were added 10.4 lit. of acetone while stirring over 5.5 hours. After added the total amount of acetone, this temperature was maintained for about 30 minutes and then an excess amount of acetone was recovered. After completed the reaction, the reaction product was dissolved in 11 lit. of trichloroethylene, and the resulting solution was washed with 6.55 lit. of 4% aqueous sodium hydroxide solution three times to extract iodine, after which the reaction product was washed with water five times repeatedly and then water is removed and thereafter trichloroethylene was evaporated to obtain 2,580 g. of dark brown resinous matter having a low softening point (this product was referred to as C).

EXAMPLE 4

Two thousand grams of 2,4-tolylenediamine were dissolved completely in about 8.2 lit. of hot water. The resulting 2,4-tolylenediamine solution was added dropwise to 5.4 lit. of 20% aqueous formaldehyde solution gradually while stirring to separate white precipitate. After added the total amount of 2,4-tolylenediamine solution, the stirring was continued for about 30 minutes. This white precipitate was filtered and dried to obtain about 1,795 g. of product. 1,000 g. of the white precipitate and 50.5 g. of iodine were dissolved in 2,000 g. of trimethyldihydroquinoline and the resulting solution was heated to about 130° C. To this solution were added 9.8 lit. of acetone while stirring to effect condensation reaction and the resulting product was added directly with 4,050 g. of concentrated hydrochloric acid and the resulting mixture was heated to about 100° C. and stirred for 6 hours, whereby the mixture was polymerized. After completed the reaction, the reaction product was diluted by adding about 10.7 lit. of water and the diluted product was dispersed in 10.7 lit. of about 15% aqueous sodium hydroxide solution to separate precipitate, which was filtered, washed with water and dried to obtain red brown powdery product of 2,700 g. (this product was referred to as D).

EXAMPLE 5

Two thousand grams of a mixture of 2,4-tolylenediamine and 2,6-tolylenediamine in a mixture ratio of 80:20 and 41 g. of iodine were fed in a reaction vessel. To the resulting mixture were added 3.3 lit. of acetone while stirring. After completed the reaction, the reaction product was dissolved in 1.6 lit. of trichloroethylene and the resulting solution was added with 1.64 lit. of 4% aqueous sodium hydroxide solution to extract iodine, after which the reaction product was washed with water repeatedly and trichloroethylene was evaporated to obtain 1,925 g. of dark brown product having a low softening point (this product was referred to as E).

EXAMPLE 6

Two thousand grams of a mixture of 2,4-tolylenediamine and 2,6-tolylenediamine in a mixture ratio of 80:20 were dissolved completely in such an amount of hot water that the total amount of solution was 4 lit. This tolylenediamine solution was added dropwise to an aqueous formaldehyde solution, which have been previously prepared by diluting 1,450 g. of 37% aqueous formaldehyde solution with 2.5 lit. of water to separate precipitate. Stirring was continued for 30 minutes and then the precipitate was filtered, washed with water and dried to obtain white yellow precipitate of 1,800 g. 1,000 g. of the precipitate and 45 g. of iodine were dissolved in 2,000 g. of trimethyldihydroquinoline and the resulting solution was heated to about 130° C. and then to the solution were added 9.75 lit. of acetone while stirring to effect condensation. After completed the reaction, the same temperature was maintained for about 30 minutes and an excess amount of acetone was removed. The resulting reaction product was dissolved in about 7.5 lit. of trichloroethylene and the resulting solution was washed by adding 4 lit. of 4% aqueous sodium hydroxide solution to remove iodine. The similar washing was repeated three times and then the reaction product was washed thoroughly with water and trichloroethylene was evaporated to obtain about 2,700 g. of dark brown resinous matter having a low softening point (this product was referred to as F).

EXAMPLE 7

One thousand grams of a reaction product of a mixture of 2,4-tolylenediamine and 2,6-tolylenediamine in a mixture ratio of 80:20 with a formaldehyde solution, which has been obtained as in Example 6, and 45 g. of iodine were dissolved in 2,000 g. of trimethyldihydroquinoline and to the resulting solution were added 9.75 lit. of acetone while heating at 130° C. to effect condensation reaction. After the reaction was completed, the same temperature was maintained for 30 minutes and an excess amount of acetone was removed. Thus the resulting product was added with an aqueous solution of sulphuric acid, in which 0.73 lit. of concentrated sulphuric acid were diluted with 1.33 lit. of water, and the resulting mixture was subjected to polymerization at 100° C. for 4 hours. After completed the polymerization, the resulting polymer was diluted with 10 lit. of water and then was added to 30 lit. of 4% aqueous sodium hydroxide solution while stirring vigorously to separate powdery precipitate, which was filtered, washed, and dried to obtain slightly reddish grey brown precipitate of 2,400 g. (this product was referred to as G).

EXAMPLE 8

Two thousand grams of 1-cyclohexylamino-2,4-phenylenediamine and 113 g. of iodine were dissolved in 5 lit. of cyclohexanol and to the resulting solution were added 15.6 lit. of acetone while heating at 130° C. and stirring. After the reaction was completed, cyclohexanol were removed by a steam distillation and then the resulting product was dissolved in an aqueous solution of hydrochloric acid in the same manner as described in the preceding example. The resulting solution was added dropwise to an excess diluted aqueous sodium hydroxide solution while stirring vigorously to obtain 2,280 g. of dark brown powdery product (this product was referred to as H).

EXAMPLE 9

Two thousand grams of 1-cyclohexylamino-2,4-phenylenediamine were dissolved in about 3 lit. of petroleum benzine and the resulting solution was added dropwise to 3.3 lit. of 20% aqueous formaldehyde solution, which have been previously prepared, gradually while cooling with ice and stirring vigorously. In this case, a small amount of surfactant was added simultaneously. The reaction product was insoluble in petroleum benzine, so that it was obtained as precipitate, which was filtered and dried to obtain a product of about 1,050 g. 1,000 g. of this product and 27.5 g. of iodine were dissolved in 2,000 g. of trimethyldihydroquinoline solvent and the resulting solution was heated to about 130° C. and added with 6 lit. of acetone gradually, while stirring. After the total amount of acetone was added, an excess amount of acetone was removed and then the reaction product was subjected to acid polymerization in the same manner as described in Example 7.

The resulting polymer was dispersed in an aqueous sodium hydroxide solution to obtain 3,100 g. of dark brown paste-like product (this product was referred to as I).

EXAMPLE 10

Five hundred grams of 1-ethoxy-2,4-phenylenediamine were dissolved completely in about 2 lit. of hot water. The resulting solution was added dropwise to a solution, in which 300 g. of 37% aqueous formaldehyde solution were diluted with 1 lit. of cold water, gradually to obtain precipitate. This precipitate was reacted with acetone by using iodine catalyst, and then the resulting product was subjected to acid polymerization by adding hydrochloric acid and then the resulting polymer was diluted and dispersed in a diluted aqueous sodium hydroxide solution while stirring vigorously in the same manner as described in Example 7 to obtain light brown powdery product (this product was referred to as J).

EXAMPLE 11

Five hundred grams of the reaction product of the mixture of 2,4-tolylenediamine and 2,6-tolylenediamine in a mixture ratio of 80:20 with formaldehyde as obtained in Example 6 were dissolved in 1,000 g. of trimethyldihydroquinoline and then added with 65 g. of boron trifluoride-phenol complex and to the resulting mixture were added 4.94 lit. of acetone, while heating at 130° C. and stirring. After added the total amount of acetone, the reaction mass was stirred for 30 minutes at the same temperature and then excess acetone was completely recovered. The resulting product was added with a solution of 383 g. of concentrated sulphuric acid in 390 ml. of water and subjected to polymerization at 100° C. for 2 hours. After completed the polymerization, the resulting polymer was diluted with 3,120 ml. of water and then added with 3.9 lit. of trichloroethylene. The resulting solution was heated to 50° C. and then added with 35% aqueous sodium hydroxide solution containing 400 g. of sodium hydroxide to effect neutralization. The reaction product was washed with 7.8 lit. of hot water repeatedly two times and then trichloroethylene was completely recovered to obtain 1,760 g. of red brown resinous matter having a low softening point (this product was referred to as K).

EXAMPLE 12

Five hundred grams of the reaction product of the mixture of 2,4-tolylenediamine and 2,6-tolylenediamine in a mixture ratio of 80:20 with formaldehyde, as obtained in Example 6, were dissolved in 1,000 g. of trimethyldihydroquinoline and then the resulting solution was added with 23.5 g. of iodine, and thereafter added with 6 lit. of methyl ethyl ketone at 130° C. After the total amount of methyl ethyl ketone was added, the resulting mixture was stirred at the same temperature for 30 minutes and then excess methyl ethyl ketone was completely recovered. The resulting product was added with a solution of 385 g. of concentrated sulphuric acid in 400 ml. of water and subjected to polymerization at 100° C. for 4 hours. After completed the polymerization, the resulting polymer was diluted with 3.1 lit. of water and then added with 3.9 lit. of trichloroethylene. In the same manner as described in the preceding example, the resulting solution was added with 15% aqueous sodium hydroxide solution at 50° C. to effect neutralization and washing. The reaction product was washed with hot water two times and then completely washed under a reduced pressure to obtain 1,730 g. of yellow brown flaky product (this product was referred to as L).

EXAMPLE 13

One thousand grams of 2,4-tolylenediamine were dissolved in 10 lit. of hot water at temperature of 40 to 50° C. and the resulting solution was added dropwise to a solution of 720 g. of acetaldehyde in 3 lit. of water, which has been previously prepared, while cooling at a temperature below 20° C. After stirred for 1 hour, precipitate was filtered, washed and dried to obtain 1,030 g. of white yellow powdery product. 500 g. of the powdery product thus obtained were dissolved in 1,000 g. of trimethyldihydroquinoline and added with 22.3 g. of iodine and then further added with 4.7 lit. of acetone at 130° C. and the resulting mixture was reacted. After completed the reaction, stirring was effected for 30 minutes at the same temperature to recover completely excess acetone. The resulting product was added with a solution of 365 g. of concentrated sulphuric acid in 370 ml. of water and polymerized at 100° C. for 4 hours and then diluted with 3 lit. of water and thereafter added with 3.7 lit. of trichloroethylene. The resulting solution was heated to 50° C. and then added with 35% aqueous sodium hydroxide solution containing 385 g. of sodium hydroxide to effect neutralization. The reaction product was washed with hot water repeatedly and then trichloroethylene was completely recovered to obtain 1,610 g. of yellow green brown flaky product (this product was referred to as M).

EXAMPLE 14

Five hundred grams of the reaction product of the mixture of 2,4-tolylenediamine and 2,6-tolylenediamine in a mixture ratio of 80:20 with formaldehyde, as obtained in Example 6, 1,000 g. of trimethyldihydroquinoline, 1,410 g. of acetophenone and 24 g. of iodine were fed into a reaction vessel and reacted at 180 to 190° C. for 3 hours and at 200° C. for 6 hours. The excess acetophenone was recovered from the reaction product under a reduced pressure and then the resulting product was dissolved in trichloroethylene by heating. The resulting solution was added with 3.9 lit. of 10% aqueous sodium hydroxide solution to remove iodide. The resulting product was washed with 4 lit. of hot water two times and then completely concentrated under a reduced pressure to obtain 2,210 g. of red brown flaky product (this product was referred to as N).

EXAMPLE 15

One thousand grams of mixture of 2,4-tolylenediamine and 2,6-tolylenediamine in a mixture ratio of 80:20 and 780 g. of benzaldehyde were fed and the resulting mixture was heated at 130 to 140° C. for one hour to dehydrate and then added with 49.2 g. of iodine. Then the resulting mixture was added with 10.4 lit. of acetone at 130° C. After the addition, stirring was continued for 30 minutes at the same temperature to recover completely excess acetone. The resutling product was dissolved in 5.5 lit. of trichloroethylene and then the resulting solution was washed with 8.2 lit. of 10% aqueous sodium hydroxide solution at 50° C. and then washed with 8 lit. of hot water two times and thereafter concentrated completely under a reduced pressure to obtain 1,930 g. of yellowish orange brown flaky product (this product was referred to as O).

EXAMPLE 16

A three necked vessel was provided with a cooling condenser and a stirrer, by which the content can be stirred and further said vessel was provided with such an apparatus that the vessel can be heated by immersing in an oil bath. This vessel was fed with 400 g. of monoethanolamine and heated at 150 to 160° C. To said vessel were added gradually 2,500 g. of flexible polyurethane foam piece made from triol polyether (average molecular weight of about 3,000 and hydroxyl value of 56) and a mixture of 2,4-tolylenediisocyanate and 2,6-tolylenediisocyanate in a mixture ratio of 80:20 as the starting materials and a mixture while stirring and said polyurethane foam piece was dissolved. The stirring was continued for about 3 hours, while maintaining the resulting solution at the same temperature to obtain 2,700 g. of greyish brown liquid. After cooled, this decomposed solution was gradually added to 80 g. of 20% aqueous formaldehyde solution previously prepared, while stirring to form white yellow precipitate of condensate. This precipitate was filtered and washed with methyl alcohol and then dried to obtain a product of 370 g.

To the apparatus as described above were fed this white yellow precipitate and 7.5 g. of iodine together with solvent thereof and the resulting mixture was heated to 130° C. and added with 600 ml. of acetone, while stirring, to effect condensation and then the resulting product was added directly with hydrochloric acid to effect acid polymerization. The resulting polymer was dispersed in about 300 ml. of 4% aqueous sodium hydroxide solution to separate slightly reddish grey brown precipitate, which was filtered and dried to obtain 350 g. of product (this product was referred to as P).

EXPERIMENTAL EXAMPLE 1

Concerning the products obtained in examples, after compounded natural rubbers having the composition shown in Table 1 were prepared by O-type small Banbury mixer, in unvulcanized rubber, Mooney scorch test was made and in vulcanized rubber, heat aging test by test tube method was achieved and the obtained results are shown in Tables 2, 3 and 4.

Furthermore, as a control sample, use was made of N-phenyl-2-naphthylamine (referred to as PBN hereinafter) and the obtained result is also shown in Tables 2, 3 and 4.

TABLE 1

| | Parts |
|---|---|
| Smoked sheet #1 | 100 |
| HAF carbon black | 50 |
| Pine tar | 6 |
| Stearic acid | 3 |
| Zinc oxide | 5 |
| N-oxydiethylene-2-benzothiazole sulphenamide | 0.5 |
| Sulphur | 2 |
| Antioxidant as described in Tables 2, 3 and 4. | |

Vulcanization condition: 145° C.×45 minutes.

EXPERIMENTAL EXAMPLE 3

Concerning the products obtained in examples, compound SBR having the composition shown in Table 6 were prepared by O-type small Banbury mixer and then vulcanized and the heat aging test by test tube method was achieved and the result is shown in Table 7.

Furthermore, the result, when using N-phenyl-2-naphthylamine as control sample, is also shown in Table 7.

TABLE 2

| Antioxidant | Mooney scorch time, min. | Before aging Hardness, Hs | Before aging Elongation, percent | Before aging Tensile strength, kg./cm.² | After aging Hardness, Hs | After aging Elongation, percent | After aging Tensile strength, kg./cm.² | Tensile strength deterioration ratio, percent |
|---|---|---|---|---|---|---|---|---|
| PBN, 1 part | 16.5 | 61 | 570 | 295 | 54 | 270 | 69 | −77 |
| PBN, 3 parts | 17.5 | 69 | 595 | 303 | 55 | 305 | 75 | −75 |
| A, 1 part | 9.0 | 63 | 535 | 298 | 56 | 270 | 71 | −76 |
| A, 3 parts | 6.0 | 65 | 585 | 304 | 60 | 260 | 81 | −73 |
| B, 1 part | 9.5 | 63 | 565 | 297 | 54 | 270 | 90 | −70 |
| B, 3 parts | 7.5 | 63 | 590 | 291 | 56 | 330 | 86 | −70 |
| C, 1 part | 11.0 | 63 | 560 | 277 | 55 | 270 | 68 | −75 |
| C, 3 parts | 8.0 | 63 | 620 | 291 | 58 | 330 | 106 | −62 |
| D, 1 part | 13.5 | 62 | 595 | 300 | 58 | 255 | 84 | −79 |
| D, 3 parts | 10.5 | 62 | 605 | 301 | 61 | 310 | 124 | −54 |
| None | 17.0 | 60 | 545 | 295 | 53 | 240 | 47 | −84 |

TABLE 3

| Antioxidant | Before aging Hardness, Hs | Before aging Elongation, percent | Before aging Tensile strength, kg./cm.² | After aging Hardness, Hs | After aging Elongation, percent | After aging Tensile strength, kg./cm.² | Tensile strength deterioration ratio, percent |
|---|---|---|---|---|---|---|---|
| PBN, 1 part | 60 | 585 | 298 | 60 | 300 | 75 | −75 |
| PBN, 3 parts | 60 | 565 | 291 | 60 | 300 | 90 | −69 |
| F, 1 part | 59 | 620 | 290 | 57 | 275 | 73 | −75 |
| F, 3 parts | 63 | 570 | 282 | 63 | 305 | 110 | −61 |

TABLE 4

| Antioxidant | Mooney scorch time, min. | Before aging Hardness, Hs | Before aging Elongation, percent | Before aging Tensile strength, kg./cm.² | After aging Hardness, Hs | After aging Elongation, percent | After aging Tensile strength, kg./cm.² | Tensile strength deterioration ratio, percent |
|---|---|---|---|---|---|---|---|---|
| PBN, 1 part | 19.5 | 62 | 540 | 281 | 58 | 220 | 69 | −75 |
| PBN, 3 parts | 19.5 | 60 | 560 | 285 | 56 | 235 | 72 | −75 |
| G, 1 part | 19.5 | 62 | 535 | 283 | 57 | 230 | 81 | −71 |
| G, 3 parts | 16.0 | 62 | 555 | 288 | 58 | 260 | 101 | −65 |
| E, 1 part | 13.0 | 62 | 530 | 293 | 61 | 225 | 86 | −71 |
| E, 3 parts | 9.5 | 67 | 570 | 277 | 65 | 255 | 109 | −61 |
| None | 20.5 | 60 | 530 | 280 | 56 | 200 | 57 | −80 |

NOTE:
Mooney scorch test was made according to JIS K-6300, wherein the test temperature was 130° C.±1° C. and the rotor was L-type.
Heat aging test was made according to JIS K-6301.
Heat aging condition was 120° C.±1° C. and 24 hours by test tube method.
The test piece by JIS K-6301 No. 3 Dumbel.

EXPERIMENTAL EXAMPLE 2

The test was carried out following to the manner described in Experimental Example 1 and the result is shown in Table 5.

TABLE 5

| Antioxidant | Before aging Hardness, Hs | Before aging Elongation, percent | Before aging Tensile strength, kg./cm.² | After aging Hardness, Hs | After aging Elongation, percent | After aging Tensile strength, kg./cm.² | Tensile strength deterioration ratio, percent |
|---|---|---|---|---|---|---|---|
| PBN, 1 part | 60 | 630 | 286 | 51 | 250 | 50 | −83 |
| PBN, 3 parts | 56 | 635 | 283 | 50 | 290 | 67 | −76 |
| K, 1 part | 59 | 590 | 270 | 52 | 220 | 46 | −83 |
| K, 3 parts | 62 | 600 | 273 | 56 | 275 | 91 | −67 |
| L, 1 part | 60 | 580 | 268 | 53 | 235 | 51 | −81 |
| L, 3 parts | 62 | 640 | 280 | 55 | 295 | 91 | −68 |
| M, 1 part | 60 | 610 | 280 | 52 | 260 | 64 | −77 |
| M, 3 parts | 61 | 625 | 272 | 53 | 350 | 105 | −61 |
| N, 1 part | 59 | 630 | 283 | 50 | 250 | 51 | −82 |
| N, 3 parts | 60 | 625 | 276 | 51 | 295 | 75 | −73 |
| O, 1 part | 61 | 595 | 278 | 51 | 230 | 41 | −85 |
| O, 3 parts | 61 | 595 | 260 | 53 | 260 | 61 | −77 |
| None | 58 | 595 | 273 | 50 | 210 | 27 | −90 |

TABLE 6

| | Parts |
|---|---|
| SBR #1500 | 100 |
| HAF carbon black | 50 |
| Circosol 2XH | 10 |
| Stearic acid | 2 |
| Zinc oxide | 3 |
| Diphenylguanidine | 0.5 |
| Dibenzothiazolyl disulphide | 1.5 |
| Sulphur | 1.5 |
| Antioxidant as described in Table 7 | |

Vulcanization condition: 145° C.×45 minutes.

As seen from the results of the described Experimental Examples 1, 2 and 3, the products according to the present invention show remarkably excellent activity for the antioxidation as compared with the antioxidant (referred to as PBN) which has been heretofore used generally, and the products obtained from the substances treated with form-

TABLE 7

| Antioxidant | Before aging | | | After aging | | | Tensile strength deterioration ratio, percent |
|---|---|---|---|---|---|---|---|
| | Hardness, Hs | Elongation, percent | Tensile strength, kg./cm.² | Hardness, Hs | Elongation, percent | Tensile strength, kg./cm.² | |
| PBN, 1 part | 60 | 450 | 267 | 66 | 225 | 168 | −37 |
| PBN, 3 parts | 60 | 455 | 265 | 64 | 275 | 175 | −34 |
| G, 1 part | 60 | 475 | 274 | 66 | 240 | 181 | −34 |
| G, 3 parts | 60 | 505 | 284 | 65 | 275 | 208 | −27 |
| None | 58 | 440 | 271 | 65 | 205 | 164 | −39 |

NOTE:
Heat aging condition was 120° C.±1° C. and 24 hours by test tube method.
The test piece by JIS K-6301 No. 3 Dumbel.

aldehyde improve scorth time as compared with the products obtained from the substances not treated with formaldehyde.

The products according to the present invention give the same antioxidant effect, even if the compounding amount is decreased than that of the conventional antioxidant.

EXPERIMENTAL EXAMPLE 4

Concerning the product P obtained in Example 16, compounded natural rubber having the composition shown in Table 8 was prepared by O-type small Banbury mixer and then vulcanized and the heat aging test by test tube method was achieved and the result is shown in Table 9.

Furthermore, the results, when using N-phenyl-2-naphthylamine (referred to as PBN) and a mixture of N-phenyl-2-naphthylamine and N,N'-diphenyl-p-phenylenediamine in a ration of 2:1 by weight (referred to as HP) as control samples, is shown in Table 9.

TABLE 8

| | Parts |
|---|---|
| Smoked sheet #1 | 100 |
| HAF carbon black | 50 |
| Pine tar | 6 |
| Stearic acid | 3 |
| Zinc oxide | 5 |
| N-oxydiethylene-2-benzothiazole sulphenamide | 0.5 |
| Sulphur | 2 |
| Antioxidant as described in Table 9 | |

Vulcanization condition: 145° C.×45 minutes.

Accordingly, advantageously the product P by the present invention can give the same antioxidant effect, even if the compounding amount is decreased than that of the conventional antioxidants PBN and HP.

What we claim is:

1. A stabilized rubber composition compounded of 100 parts by weight of a rubber selected from the group consisting of natural rubber and synthetic rubber and 0.01 to 5.0 parts by weight of an antioxidant obtained by condensing 1 mol of at least one diamine having the general formula:

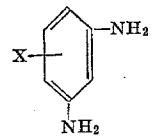

wherein X is a member selected from the group consisting of hydrogen atom, hydroxy group, chlorine atom, methyl group, methoxy group, phenylamino group, cyclohexylamino group and morpholino group, with 2 to 4 mol of at least one ketone compound in the presence of a catalyst selected from the group consisting of iodine and boron trifluoride at a temperature of 100 to 200° C.

2. The stabilized rubber and composition as claimed in claim 1, wherein said ketone compound is selected from the group consisting of acetone, methyl ethyl ketone and acetophenone.

3. The stabilized rubber composition as claimed in claim 1, wherein said catalyst is used in an amount of 1.5 to 15% by weight based on said diamine.

4. A stabilized rubber composition compounded of 100 parts by weight of a rubber selected from the group consisting of natural rubber and synthetic rubber and 0.01 to 5.0 parts by weight of an antioxidant obtained by reacting 1 mol of at least one diamine having the general formula:

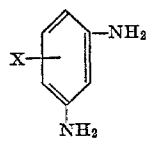

wherein X is a member selected from the group consisting of hydrogen atom, hydroxyl group, chlorine atom, methyl group, methoxy group, phenylamino group, cyclohexyl-

TABLE 9

| Antioxidant | Before aging | | | After aging | | | Tensile strength deterioration ratio, percent |
|---|---|---|---|---|---|---|---|
| | Hardness, Hs | Elongation, percent | Tensile strength, kg./cm.² | Hardness, Hs | Elongation, percent | Tensile strength, kg./cm.² | |
| HP, 1 part | 60 | 550 | 295 | 55 | 260 | 76 | −74 |
| HP, 2 parts | 62 | 550 | 293 | 57 | 265 | 83 | −72 |
| PBN, 1 part | 61 | 565 | 292 | 50 | 250 | 65 | −78 |
| PBN, 2 parts | 61 | 565 | 286 | 53 | 285 | 72 | −75 |
| P, 1 part | 62 | 560 | 293 | 53 | 265 | 79 | −73 |
| P, 2 parts | 63 | 590 | 287 | 57 | 270 | 97 | −66 |
| None | 60 | 540 | 281 | 51 | 245 | 49 | −83 |

NOTE:
The test was made following to JIS K-6301.
Heat aging condition was 120° C.±1° C. and 24 hours by test tube method.
The test piece by JIS K-6301 No. 3 Dumbel.

amino group and morpholino group, with 1.5 to 3.5 mol of an aldehyde at room temperature or while being cooled to produce an amine intermediate and reacting the resulting amine intermediate with 2 to 4 mol per mol of the diamine of at least one ketone compound in the presence of a catalyst selected from the group consisting of iodine and boron trifluoride at a temperature of 100 to 200° C.

5. The stabilized rubber composition as claimed in claim 4, wherein said ketone compound is selected from the group consisting of acetone, methyl ethyl ketone and acetophenone.

6. The stabilized rubber composition as claimed in claim 4, wherein said catalyst is used in an amount of 1.5 to 10% by weight based on said diamine.

7. The stabilized rubber composition as claimed in claim 4, wherein said aldehyde is selected from the group consisting of formaldehyde and acetaldehyde.

8. A stabilized rubber composition compounded of 100 parts by weight of a rubber selected from the group consisting of natural rubber and synthetic rubber and 0.01 to 5.0 parts by weight of powdery antioxidant obtained by reacting 1 mol of at least one diamine having the general formula:

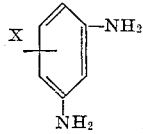

wherein X is a member selected from the group consisting of hydrogen atom, hydroxyl group, chlorine atom, methyl group, methoxy group, phenylamino group, cyclohexylamino group and morpholino group, with 2 to 4 mol of at least one ketone compound in the presence of a catalyst selected from the group consisting of iodine and boron trifluoride at a temperature of 100 to 200° C. to produce an amine-ketone condensate, polymerizing the resulting amine-ketone condensate by adding an acid and then pouring the resulting polymer into an aqueous alkali solution to neutralize the polymer.

9. The stabilized rubber composition as claimed in claim 8, wherein said ketone compound is selected from the group consisting of acetone, methyl ethyl ketone and acetophenone.

10. The stabilized rubber composition as claimed in claim 8, wherein said catalyst is used in an amount of 1.5 to 15% by weight based on said diamine.

11. The stabilized rubber composition as claimed in claim 8, wherein said alkali is a sufficient amount of sodium hydroxide to neutralize the acid used in the polymerization.

12. The stabilized rubber composition as claimed in claim 8, wherein said acid polymerization is effected by adding 10 to 300% by weight based on the amine-ketone condensate of an acid selected from the group consisting of hydrochloric acid and sulfuric acid at a temperature of 50 to 150° C.

13. A stabilized rubber composition composed of 100 parts by weight of a rubber selected from the group consisting of natural rubber and synthetic rubber and 0.01 to 5.0 parts by weight of a powdery antioxidant obtained by reacting 1 mol of at least one diamine having the general formula:

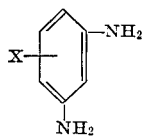

wherein X is a member selected from the group consisting of hydrogen atom, hydroxyl group, chlorine atom, methyl group, methoxy group, phenylamino group, cyclohexylamino group and morpholino group, with 1.5 to 3.5 mol of an aldehyde at room temperature or while being cooled to produce an amine intermediate and reacting the resulting amine intermediate with 2 to 4 mol per mol of the diamine of a ketone compound in the presence of a catalyst selected from the group consisting of iodine and boron trifluoride at a temperature of 100 to 200° C. to produce an amine-ketone condensate, polymerizing the resulting amine-ketone condensate by adding an acid and then pouring the resulting polymer into an aqueous alkali solution to neutralize the polymer.

14. The stabilized rubber composition as claimed in claim 13, wherein said ketone compound is selected from the group consisting of acetone, methyl ethyl ketone and acetophenone.

15. The stabilized rubber composition as claimed in claim 13, wherein said catalyst is used in an amount of 1.5 to 15% by weight based on said diamine.

16. The stabilized rubber composition as claimed in claim 13, wherein said aldehyde is selected from the group consisting of formaldehyde and acetaldehyde.

17. The stabilized rubber composition as claimed in claim 13, wherein said alkali is a sufficient amount of sodium hydroxide to neutralize the acid used in the polymerization.

18. The stabilized rubber composition as claimed in claim 13, wherein said acid polymerization is effected by adding 10 to 300% by weight based on the amine-ketone condensate of an acid selected from the group consisting of hydrochloric acid and sulfuric acid at a temperature of 50 to 150° C.

19. A stabilized rubber composition compounded of 100 parts by weight of a rubber selected from the group consisting of natural rubber and synthetic rubber and 0.01 to 5.0 parts by weight of a flaky antioxidant obtained by condensing 1 mol of at least one diamine having the general formula

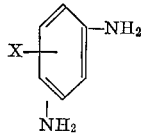

wherein X is a member selected from the group consisting of hydrogen atom, hydroxyl group, chlorine atom, methyl group, methoxy group, phenylamino group, cyclohexylamino group and morpholino group, with 2 to 4 mol of at least one ketone compound in the presence of a catalyst selected from the group consisting of iodine and boron trifluoride at a temperature of 100 to 200° C. to produce an amine-ketone condensate, polymerizing the resulting amine-ketone condensate by adding an acid, dissolving the resulting polymer in a halogenated hydrocarbon, neutralizing the resulting solution with an aqueous alkali solution and evaporating the hydrocarbon solvent.

20. The stabilized rubber composition as claimed in claim 19, wherein said ketone compound is selected from the group consisting of acetone, methyl ethyl ketone, and acetophenone.

21. The stabilized rubber composition as claimed in claim 19, wherein said catalyst is used in an amount of 1.5 to 15% by weight based on said diamine.

22. The stabilized rubber composition as claimed in claim 19, wherein said alkali is a sufficient amount of sodium hydroxide to neutralize the acid used in the polymerization.

23. The stabilized rubber composition as claimed in claim 19, wherein said acid polymerization is effected by adding 10 to 300% by weight based on the amine-ketone condensate of an acid selected from the group consisting of hydrochloric acid and sulfuric acid at a temperature of 50 to 150° C.

24. The stabilized rubber composition as claimed in claim 19, wherein said halogenated hydrocarbon is 500 to 1,000% by weight based on said diamine of trichloro- 25. A stabilized rubber composition compounded of 100 parts by weight of a rubber selected from the group consisting of natural rubber and synthetic rubber and 0.01 to 5.0 parts by weight of a flaky antioxidant obtained by reacting 1 mol of at least one diamine having the general formula

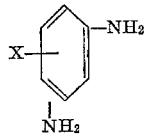

wherein X is a member selected from the group consisting of hydrogen atom, hydroxyl group, chlorine atom, methyl group, methoxy group, phenylamino group, cyclohexylamino group and morpholino group, with 1.5 to 3.5 mol of an aldehyde at room temperature or while being cooled to produce an amine intermediate and reacting the resulting amine intermediate with 2 to 4 mol per mol of the diamine of a ketone compound in the presence of a catalyst selected from the group consisting of iodine and boron trifluoride at a temperature of 100 to 200° C. to produce an amine-ketone condensate, polymerizing the resulting amine-ketone condensate by adding an acid and then dissolving the resulting polymer in a halogenated hydrocarbon, neutralizing the resulting solution with an aqueous alkaline solution and evaporating the hydrocarbon solvent.

26. The stabilized rubber composition as claimed in claim 25, wherein the ketone compound is selected from the group consisting of acetone, methyl ethyl ketone and acetophenone.

27. The stabilized rubber composition as claimed in claim 25, wherein said aldehyde is selected from the group consisting of formaldehyde and acetaldehyde.

28. The stabilized rubber composition as claimed in claim 25, wherein said alkali is a sufficient amount of sodium hydroxide to neutralize the acid used in the polymerization.

29. The stabilized rubber composition as claimed in claim 25, wherein said acid polymerization is effected by adding 10 to 300% by weight based on the amine-ketone condensate of an acid selected from the group consisting of hydrochloric acid and sulfuric acid at a temperature of 50 to 150° C.

30. The stabilized rubber composition as claimed in claim 25, wherein said halogenated hydrocarbon is 500 to 1,000% by weight based on said diamine of trichloroethylene.

References Cited

UNITED STATES PATENTS

| | | | |
|---|---|---|---|
| 1,860,434 | 5/1932 | Semon | 260—72.5 |
| 2,000,039 | 5/1935 | Semon et al. | 260—64 |
| 2,002,642 | 5/1935 | Meuser et al. | 260—65 |
| 2,089,302 | 8/1937 | Semon et al. | 260—65 |
| 2,582,849 | 1/1952 | Bloemendaal | 260—64 |
| 2,588,784 | 3/1952 | Whittaker et al. | 260—72.5 |
| 3,032,526 | 5/1962 | Smith et al. | 260—65 |

SAMUEL H. BLECH, Primary Examiner

M. J. TULLY, Assistant Examiner

U.S. Cl. X.R.

260—45.9, 50, 64, 65, 72.5, 852, 887